J. L. CHACKAN.
AUTOMOBILE LOCK.
APPLICATION FILED JULY 8, 1918.
1,340,326.
Patented May 18, 1920.
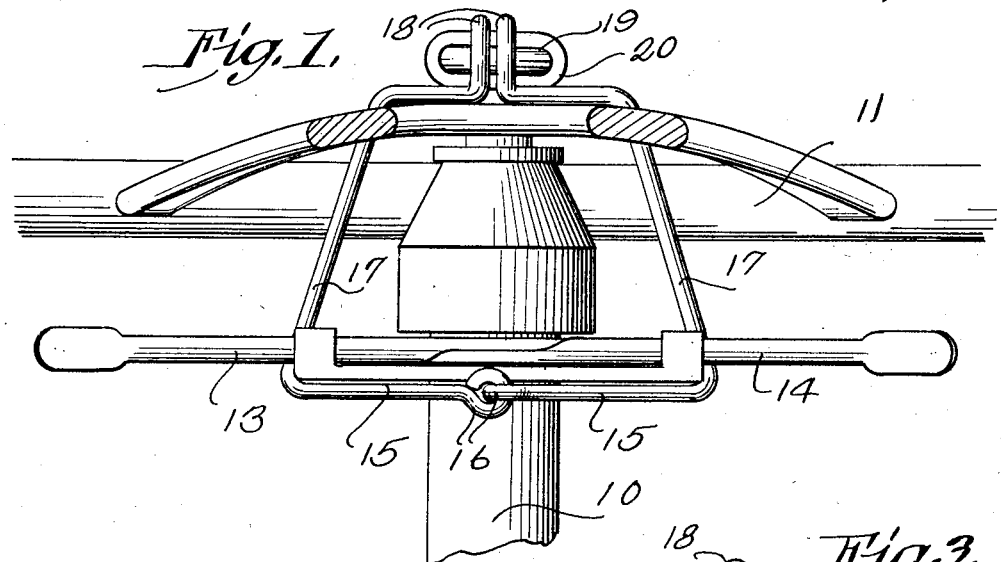
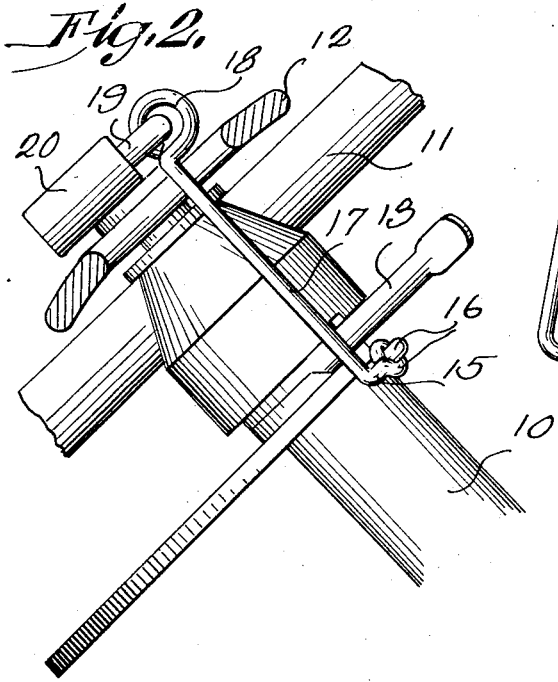
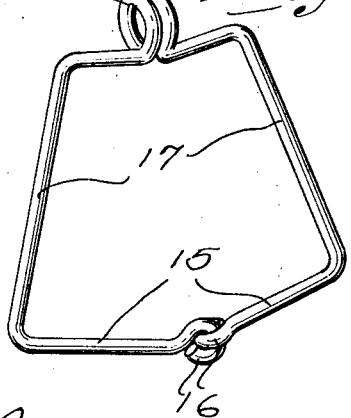

UNITED STATES PATENT OFFICE.

JOSEPH L. CHACKAN, OF MAMMOTH, PENNSYLVANIA.

AUTOMOBILE-LOCK.

1,340,326.      Specification of Letters Patent.      Patented May 18, 1920.

Application filed July 8, 1918. Serial No. 243,850.

*To all whom it may concern:*

Be it known that I, JOSEPH L. CHACKAN, a citizen of the United States, residing at Mammoth, in the county of Westmoreland, State of Pennsylvania, have invented certain new and useful Improvements in Automobile-Locks; and I do hereby declare the following to be a full, clear, and exact description of the invention, such as will enable others skilled in the art to which it appertains to make and use the same.

This invention relates to new and useful improvements in locks and particularly to locks for automobiles.

One object of the present invention is to provide a novel and improved device of this character whereby the steering wheel, together with the spark and gas levers, can be effectively locked against unauthorized movement.

Another object is to provide a novel and improved device of this character which is simple and cheap in its construction, effective and durable in its operation, and which is composed of the minimum number of parts.

Other objects and advantages will be apparent from the following description when taken in connection with the accompanying drawing.

In the drawing:

Figure 1 is a front elevation of a steering wheel and a portion of the steering column of an automobile, showing my invention applied thereto, Fig. 2 is a side elevation of the same.

Fig. 3 is an enlarged perspective view of the locking device removed.

Referring particularly to the accompanying drawing, 10 represents a portion of the steering column of an automobile, and 11 the steering wheel thereof, the latter including the spokes 12. The gas lever is shown at 13 and the spark lever at 14, in connection with all of which my invention is particularly adapted for use.

The locking device includes a pair of substantially L-shaped wire members of suitable gage and stiffness for the purpose, the outer ends of the foot portions 15 of which are formed with the interlocking eyes 16. The stems 17 of the L-shaped members are bent to extend at obtuse angles from the foot portions, whereby when the said members are properly engaged with the steering wheel they form a triangular frame. The outer ends of the said stems 17 are formed with the eyes 18 for the reception of the shackle 19 of the padlock 20.

In the application of the device the free ends of the L-shaped members are disposed in embracing relation to the gas and spark levers, after said levers have been turned to inoperative position, said ends being also passed upwardly between the spokes of the steering wheel, as clearly shown in the drawing. The shackle of the padlock is then inserted through the eyes 18 whereby the members are held against removal. By this application of the device, the gas and spark levers are held against any movement, while at the same time the steering wheel is held against operation. Thus the automobile is locked against unauthorized use.

What is claimed is:

A device for securing the spark and gas levers of an automobile comprising a pair of duplicate U-shaped members each formed of a strand of heavy rod metal bent to provide a straight intermediate portion and laterally directed end portions, said end portions of one member being directed toward the corresponding end portions of the other member, one set of end portions being bent to provide interlocking eyes loosely connecting the members and the second set of end portions being bent to provide unconnected eyes extending at approximately right angles to their end portions and in parallel relation to each other to receive a locking element adapted to pass through the eyes when positioned in operative relation.

In testimony whereof, I affix my signature, in the presence of two witnesses.

JOSEPH L. CHACKAN.

Witnesses:
    EARNEST L. OVERLY,
    JOHN OVERLY.